United States Patent [19]

Brakus

[11] 4,453,205
[45] Jun. 5, 1984

[54] DC/AC CONVERTER WITH SHUNT REGULATED LOAD

[75] Inventor: Bogdan Brakus, Puchheim, Fed. Rep. of Germany

[73] Assignee: Siemens Aktiengesellschaft, Berlin & Munich, Fed. Rep. of Germany

[21] Appl. No.: 312,148

[22] Filed: Oct. 16, 1981

[30] Foreign Application Priority Data

Oct. 28, 1980 [DE] Fed. Rep. of Germany ....... 3040556

[51] Int. Cl.³ .............................................. H02P 13/20
[52] U.S. Cl. ...................................... 363/8; 323/226; 363/95; 363/124
[58] Field of Search ................. 363/8, 40, 80, 95, 98, 363/124, 132; 323/223, 226

[56] References Cited

U.S. PATENT DOCUMENTS

| | | | |
|---|---|---|---|
| 4,244,015 | 6/1981 | Beebe | 363/8 |
| 4,340,931 | 7/1982 | Endo et al. | 363/124 |
| 4,359,679 | 11/1982 | Regan | 363/26 |

FOREIGN PATENT DOCUMENTS

558098  1/1975  Switzerland ..................... 323/226

OTHER PUBLICATIONS

Conference; 2nd International Conference on Electrical Variable, Speed Drives, pp. 136-139, (Sep. 22-27, 1979), London, England.
IBM Technical Disclosure Bulletin, vol. 24, No. 3, pp. 1437-1438, Aug. 1981.
Aritcle Entitled "Uninterruptible AC Power Supply System, Type BZV 102", A. Hansson, Ericsson Review No. 1, 1979.
Article Entitled "Modulating the Flyback Inverter Reduces Supply's Bulk", V. Brunstein, Electronics/Aug. 2, 1979, p. 119.
Article Entitled "Power Inverter Achieves Efficiency of Over 90% for Low Outputs", A. Erickson, Electronics/Dec. 6, 1979, pp. 69-70.

*Primary Examiner*—William H. Beha, Jr.
*Attorney, Agent, or Firm*—Hill, Van Santen, Steadman & Simpson

[57] ABSTRACT

A circuit including a dc/ac converter for supplying an ac consumer with an alternating voltage, such as a sinusoidal voltage, from a dc voltage source has an auxiliary load circuit which is connected in parallel with the ac consumer, the auxiliary load circuit being switched into the overall circuit by a controlled switching element. The control electrode of the controlled switching element is connected to the output of a voltage comparator, having inputs respectively supplied with an actual voltage derived from the voltage being used by the ac consumer and a theoretical signal derived from the output voltage of the dc/ac converter or from a reference oscillator which controls the converter. The controlled switching element becomes conductive when, as a result of the release of electrical or magnetic energy stored in reactive impedance components, the voltage used by the ac consumer exceeds an instantaneous value of the theoretical signal.

4 Claims, 9 Drawing Figures

DC/AC CONVERTER WITH SHUNT REGULATED LOAD

BACKGROUND OF THE INVENTION

1. Field of the Invention

The present invention relates to circuits including a dc/ac converter for supplying an ac consumer with an alternating voltage from a dc voltage source, and in particular to such a circuit which supplies the alternating voltage, in particular a sinusoidal voltage, independently of the nature of the ac consumer load.

2. Description of the Prior Art

Generation of alternating voltages such as sinusoidal voltages from a direct voltage source such as a battery by the employment of dc/ac converters is generally known. The purpose of such circuits is basically to insure continued supply of an alternating voltage to those consumers which require exclusively alternating voltage, such as for operating motors, or to those consumers whose standard design for ac operation cannot be modified. In the event of a mains breakdown or if no mains terminal is available, the needed alternating voltage can be supplied from a battery or other direct voltage source by the use of such converters.

The state of the art for high grade dc/ac converters is described in the periodicals "Ericsson Revue", No. 1, 1979 beginning at page 34 and "Electronics", Aug. 2, 1979, page 119 and Dec. 6, 1979, pages 69-70. The conventional dc/ac converters described in those articles contain a so-called transverter which is designed as a blocking converter or as a push-push or push-pull through flow converter which oscillates at a frequency which is substantially higher than the frequency of the desired alternating voltage. The transverter output can be modulated, such as by pulse duration modulation, by a modulation signal which corresponds to the desired alternating voltage and which is derived from a reference oscillator. In general, controlled switching elements which assume respective conducting and non-conducting states in dependence upon current direction such as, for example, thyristors. The controlled switching elements are interconnected between the transverter and the ac consumer and by virtue of the alternating operation of the switching elements the desired alternating voltage can be assembled from consecutive half waves.

Because of the presence of the controlled switching elements which operate in dependence upon current direction, conventional circuit arrangements of the type described above can transmit energy in only one direction. If the ac consumer who is to be supplied represents a complex load, distortions occur in the alternating voltage which originate from the energy which is periodically stored in reactance components of the load resistance. As is known, the energy stored periodically in the non-ohmic components of a load resistance must be periodically dissipated, that is, the energy must be nullified or returned to the source or used in another manner. The effect of the stored energy is to cause the output voltage to rise above a theoretical value of the desired alternating voltage. Magnetic energy stored in inductive reactive impedances results in a voltage excess during the rising portion of a theoretical voltage value curve, whereas electrical energy stored in capacitive load components results in a voltage excess during the falling portion of the theoretical voltage value. This latter deviation from the theoretical value is of particular importance because of the necessary presence of filter capacitors in the dc/ac converter.

One attempt to compensate capacitive or inductive reactive power is to employ appropriately dimensioned dual components, this technique being referred to as resonance tuning. Resonance tuning, however, is possible only for the fundamental wave of the alternating voltage.

In general, however, the above-described problem of compensation for complex load impedances is virtually disregarded in the design and operation of conventional dc/ac converters. Such converters are designed and operated under the assumption that a completely ohmic load is present, and distortion resulting from deviations from this ideal assumption are accepted. Apart from the fact that only the fundamental wave can be acted upon by resonance tuning, load compensation by resonance tuning has the further disadvantage that such tuning relates only to a specific given load value, and thus devices employing resonance tuning cannot be universally employed unless the compensating elements are greatly over-dimensioned. In many applications, the space and weight requirements of such over-dimensioned components constitute a significant disadvantage.

SUMMARY OF THE INVENTION

It is an object of the present invention to provide a circuit for supplying an ac consumer with an alternating voltage from a dc source which includes a dc/ac converter wherein the alternating voltage supplied by the circuit exhibits the desired time-related curve independently of the nature of the load.

It is a further object of the present invention to provide such a circuit including controlled switching elements which operate in dependence upon current direction which are not subjected to voltage peaks caused by the reactive power.

The above objects are inventively achieved in a circuit which includes a dc/ac converter and an auxiliary load which is connected in parallel with the ac consumer in which the auxiliary load is switched into the circuit in the event of deviations from the actual voltage which is supplied to the consumer from a desired theoretical voltage and which eliminates the corresponding voltage excess, or reduces the voltage to a level which corresponds to a tolerable distortion factor.

In one embodiment of the invention the energy withdrawn from the auxiliary load is returned to the dc source, such as a battery. For this purpose the auxiliary circuit is itself designed as part of a transverter whose output voltage can be supplied to the dc source following rectification.

A controlled switching element is employed to switch the auxiliary load into and out of the circuit. The controlled switching element is connected such that during one half wave of the desired alternating voltage the switching element is repeatedly reversed between its conducting and non-conducting states. This reversal can take place in free oscillating fashion with the only limitation being a limitation of the switch-on time which results from suitably dimensioned time delay elements operating in the control circuit for the switching element, and can also be externally controlled in which case the external control is preferably derived from the comparatively high frequency of the transverter referred to earlier.

The auxiliary load circuit is preferably connected to the ac consumer via a full-wave rectifier bridge. This provides the advantage that the auxiliary load circuit, and in particular the switching element associated therewith, can be dependent upon current direction at the time of the periodic switch-on because the auxiliary load and the switching element are always supplied with the two half-waves of the ac consumer voltage with the same polarity as a result of the full-wave rectification.

DESCRIPTION OF THE PREFERRED EMBODIMENTS

Figure 1:
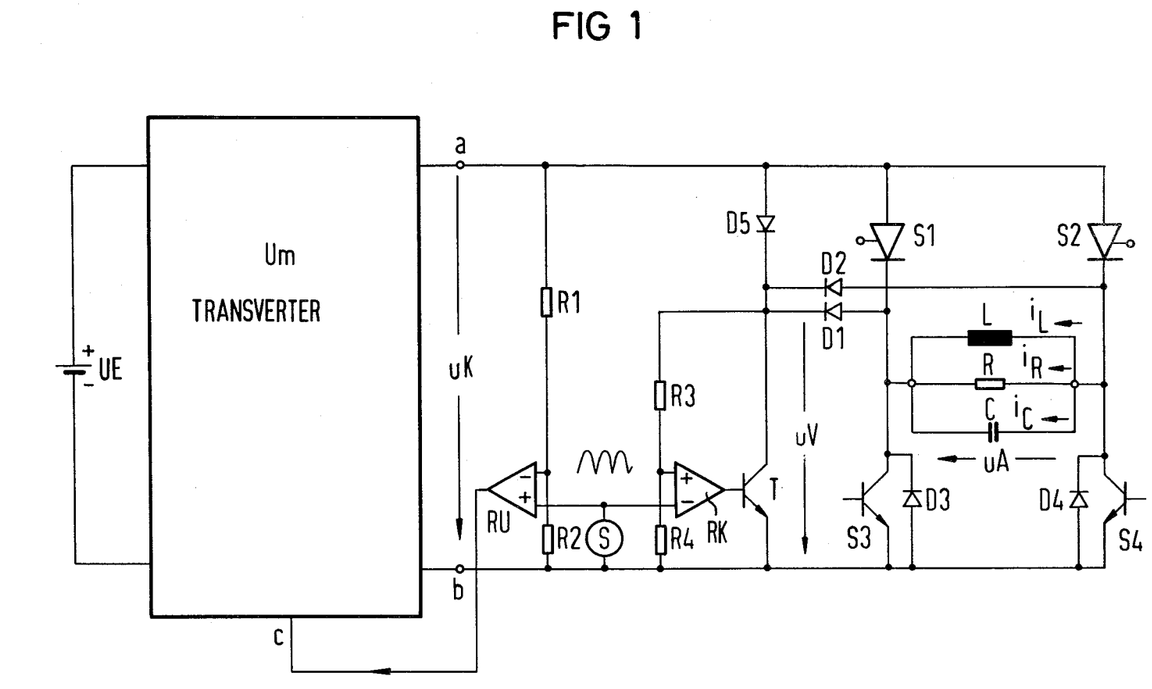
FIG. 1 is a schematic circuit diagram of a circuit for supplying an alternating voltage to an ac consumer from a direct current source including a dc/ac converter constructed in accordance with the principles of the present invention employing a linear controlled switching element.

A circuit for supplying an ac voltage to an ac consumer from a direct current source UE is shown in FIG. 1. The circuit includes a transverter Um which is a modulated transverter, that is, the output voltage uK which is present across the terminals a and b of the transverter Um changes in amplitude in dependence upon a modulation signal which is supplied to a modulation input c. The transverter Um contains an electronic chopper circuit which oscillates at a pulse frequency which is high in comparison to the frequency of the modulation signal. The modulation is preferably pulse duration modulation, that is, the width or duration of the chopper pulses is modified in accordance with the modulation signal.

The modulation signal is supplied to the terminal c by a reference oscillator, which in the present example supplies a sinusoidal voltage having a frequency corresponding to that of the desired output voltage. The reference oscillator forms a part of the source which is referenced at S. The output signal from the source S is a full-wave rectified sinusoidal voltage. This voltage is supplied to a first input of a comparator RU. A subsidiary voltage of the output voltage uK obtained from a voltage divider consisting of resistors R1 and R2 is supplied to a second input of the comparator RU. The voltage divider and the comparator RU form a part of a regulating circuit by which the output voltage uK of the transverter uM is regulated in such a manner that it follows the output voltage of the source S.

Accordingly the output voltage uK follows the course of a commutated sinusoidal curve. The output voltage uK is periodically reversed in polarity by means of a bridge circuit consisting of two thyristers S1 and S2 and two transistors S3 and S4 in such a manner that each second half wave is commutated and thus a continuous oscillation is assembled. The periodic operation of the thyristers S1 and S2 and the transistors S3 and S4 takes place in a manner known to those skilled in the art which is not shown in greater detail with the aid of suitable control signals which are derived from the previously-described reference oscillator.

The ac consumer who is to be supplied by the circuit shown in FIG. 1 is assumed to be representable by a complex load impedance which consists of a resistor R, an inductance L, and a capacitance C. The voltage occurring across the ac consumer load impedance is referenced uA. The respective currents flowing through the individual load components are reference $i_R$, $i_L$, and $i_C$.

The circuit of FIG. 1 further includes a rectifier bridge comprised of diodes D1, D2, D3 and D4 which has an output voltage referenced at UV. The output of this rectifier bridge is loaded by the collector-emitter path of a transistor T. The base of the transistor T is connected to the output of a second comparator RK having two inputs to which the voltage output of the source S and a portion of the voltage UV are respectively supplied. The portion of the voltage UV supplied to the second comparator RK is derived by a second voltage divider consisting of resistors R3 and R4.

In addition to the rectifier bridge consisting of the diodes D1 through D4, a further diode D5 is provided which directly connects the output terminal A of the transverter Um to the auxiliary load circuit which contains the transistor T. Via the diode D5 the filter capacitor contained in the transverter Um is also included in the reactive load compensation.

Figure 2A:
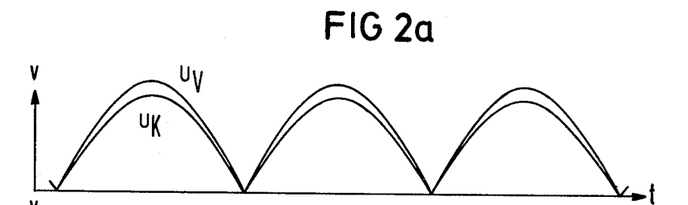
FIGS. 2a, 2b, 2c and 2d are voltage/time diagrams showing various waveforms associated with the circuit of FIG. 1.

The operation of the circuit shown in FIG. 1 will be explained in detail with reference to the waveforms shown in the voltage/time diagrams of FIG. 2.

The output voltage uK appearing at the output terminals a and b of the transverter Um displays a time-related curve which fundamentally corresponds to the theoretical voltage of the source S as a result of the regulation by the comparator RU. The voltage UV derived from the voltage uA by means of rectification is compared with the theoretical voltage in the second comparator RK. The regulating circuit including the comparator RK operates such that the transistor T is conductive, and receives the reactive current of the capacitive or inductive components C and L of the load impedance, when the voltage UV exceeds the theoretical voltage. In this case the energy excess in the transistor T is consumed so that during the range of operation in question the voltage UV follows the half-wave of the theoretical voltage. As a result the voltage uA across the consumer load impedance acquires the desired sinusoidal form with a distortion resulting from the spacing between the curves UV and uK shown in FIG. 2a. This voltage spacing is shown greatly exaggerated in FIG. 2a for greater clarity. In practice, however, this spacing is sufficiently small to insure that the resulting distortion factor does not exceed a predetermined value. The current $i_R$ and the voltage uA are shown in FIG. 2 in the case of a purely ohmic load. It can be seen that the two curves are equal in phase and no distortion of the output voltage uA occurs. The corresponding curves for a purely inductive load are shown in FIG. 2c. In the case of such a purely inductive load, following each 0 crossing of the voltage uA, the inductance L stores magentic energy having a value proportional to the square of the peak value of the current $i_L$ and one half of the inductance L. This magnetic energy results in an increase in the output voltage uA to the value governed by the voltage UV. At each 0 crossing of the current $i_L$ the magnetic energy has been entirely consumed so that the output voltage Ua returns to the value of uK.

Figures 2B, 2C, 2D:
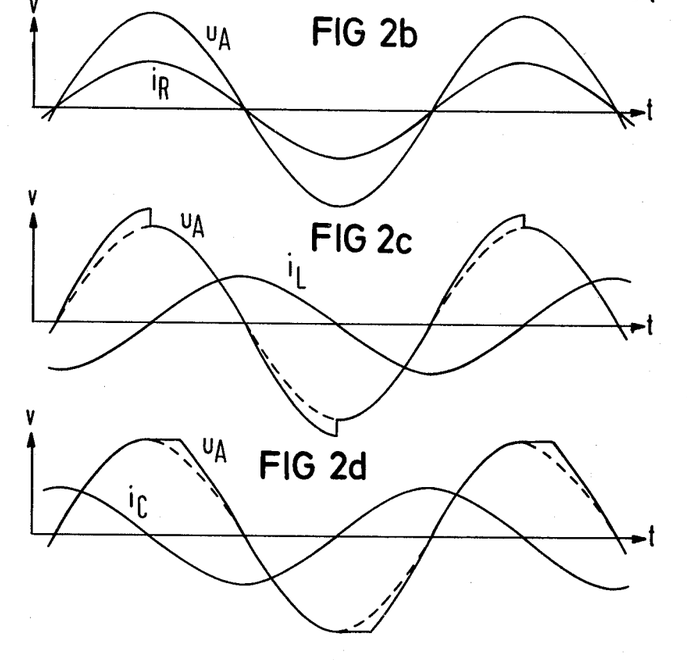

In those cases wherein the load impedance is purely capacitive, as shown in FIG. 2d, the load impedance stores electrical energy having a value proportional to the square of the peak value of the voltage uA and one half of the capacitance C. In the same manner as the magnetic energy in the case of the inductive load behaved, this electrical energy cannot discharge via the switching elements S1 through S4 which are dependent upon current direction. Therefore, the load attempts to maintain the voltage uA at the peak value until the regulation by the auxiliary load circuit comes into operation.

Figure 3:
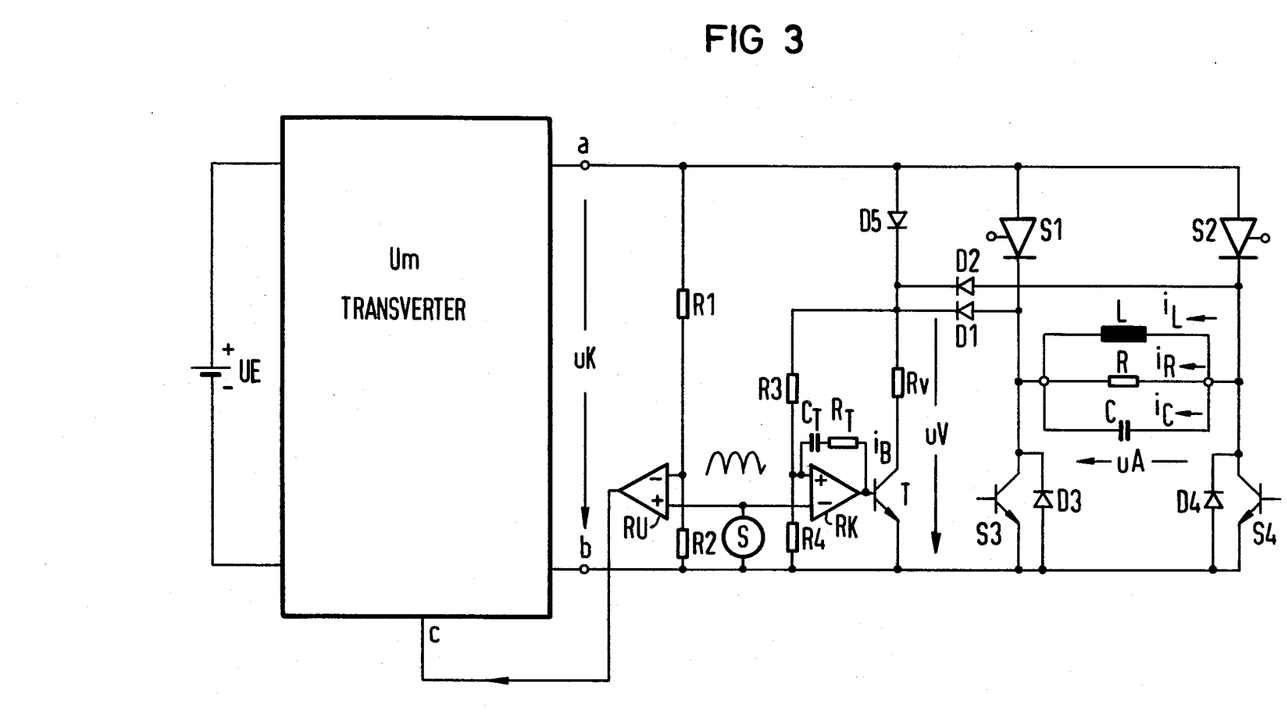
FIG. 3 is a schematic diagram of a second embodiment of the invention shown in FIG. 1 having an ohmic resistor which has characteristics which are to be compensated during the operation of the circuit.

In the further embodiment of the invention shown in FIG. 3 the auxiliary load circuit is not formed exclusively by the collector-emitter path of the transistor T, as in the circuit shown in FIG. 1, but further contains a resistor Rv so that the excess power is not exclusively converted into heat loss in the transistor T. The remaining components shown in FIG. 3 correspond to those shown in FIG. 1 and have been referenced with the same reference numerals.

The transistor T in FIG. 3 represents a switch which exhibits a very small power loss. During the regulating process the transistor T is switched on and off at a comparatively high frequency. The time-related curves for the corresponding voltages UV and uK and the current $i_B$ which flows through the transistor T are shown in FIG. 4.

The operation of the circuit shown in FIG. 3 is as follows. As soon as the voltage uA becomes "too high," the transistor T is switched on. As a result the voltage uA drops below the theoretical value and the transistor T is again switched off. In order to reduce the switching frequency and to reduce the losses associated therewith, a time delay element consisting of a resistor RT and a capacitor CT is interconnected as a feedback loop between the output of the comparator Rk and the input thereof which is connected to the voltage uV. The time delay element lengthens the duration of the individual switching states to a predetermined value and thus limits the maximum switching frequency.

Figure 4:
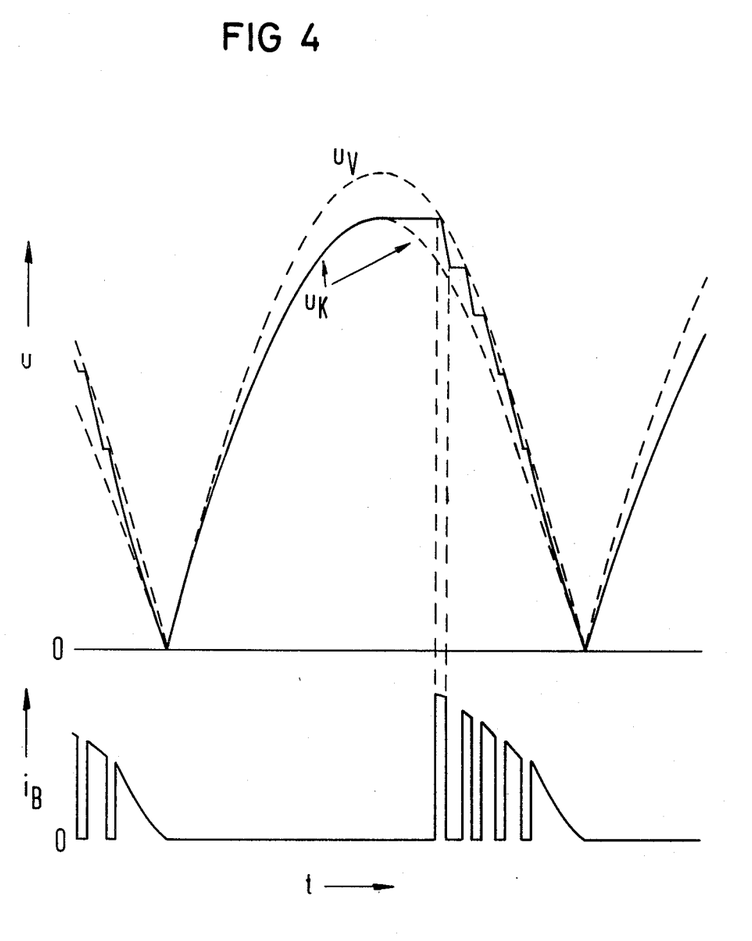
FIG. 4 is a voltage/time diagram exhibiting waveforms explaining the operation of the circuit shown in FIG. 3.

As can be seen from FIG. 4, the desired sinusoidal curve is approximated by a step curve. In the event of a predominantly inductive load, a smoothing capacitor may be required at the output of the circuit in order to absorb the inductive current in the switching pauses of the transistor T.

Figure 5:
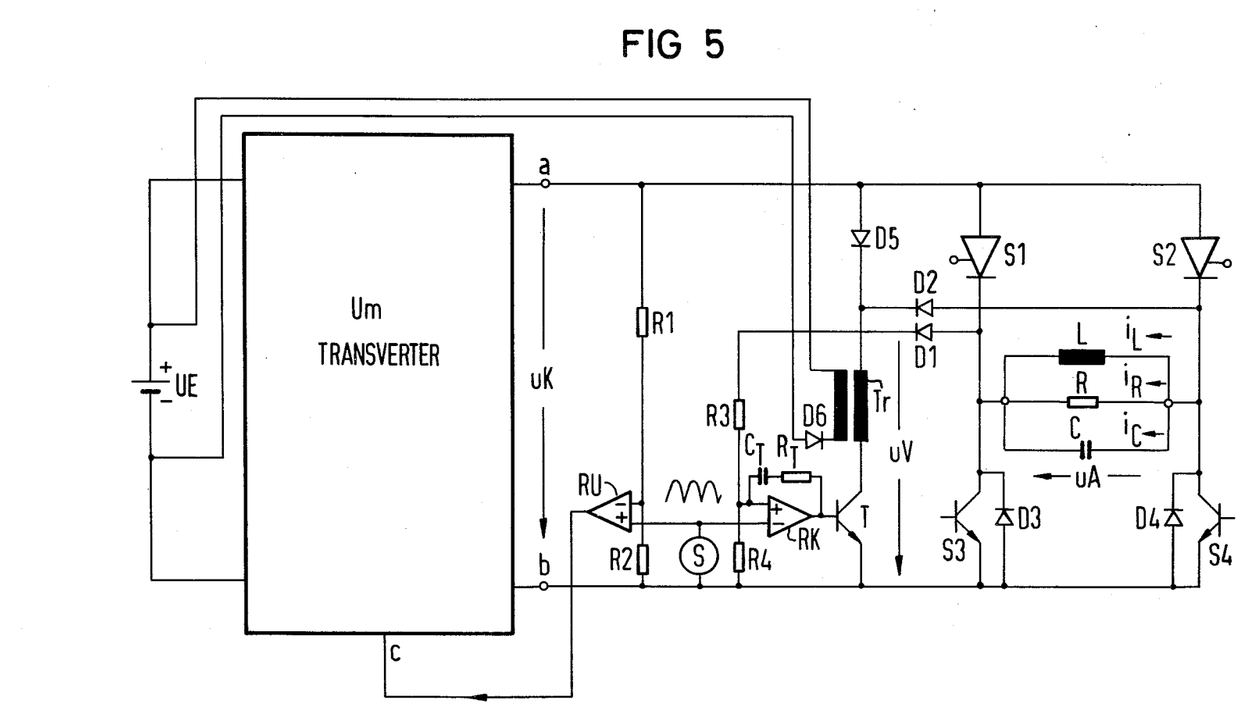
FIG. 5 is another embodiment of the invention shown in FIG. 1 wherein the auxiliary load circuit forms part of a transverter whose output power is returned to the dc source.
Figure 6:
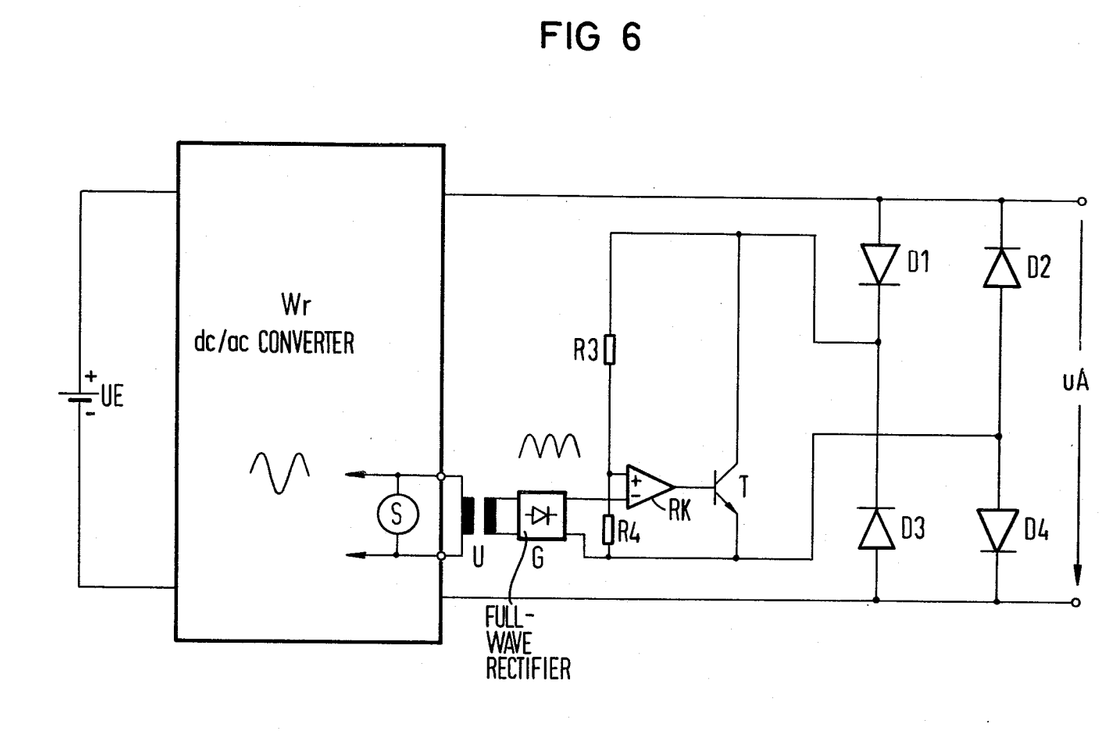
FIG. 6 is a schematic circuit diagram showing the general usage of electronic reactive load compensation in accordance with the principles of the present invention.

A further embodiment of the invention is shown in FIG. 5 in which the energy received from the auxiliary load circuit is returned to the direct current supply source UE. For this purpose the load impedance Rv which was present in the circuit of FIG. 3 has been replaced by the primary winding of a transformer Tr. The transformer Tr forms a portion of a blocking converter which oscillates at the switch-on and switch-off frequency of the transistor T. The voltage transmitted to the secondary side of the transformer Tr is rectified by means of a diode D6, and is returned to the source UE during the blocking phase. It is also possible, for example, to employ other transverters in place of the blocking converter for returning the energy. In the above-described exemplary embodiments, the dc/ac converter Um which serves to supply the ac consumer has been described as a modulateable dc transverter whose output voltage uK is assembled by a current reversing bridge to form a sinusoidal voltage. The principles of the present invention are not, however, limited to employment of dc/ac converters of this type but may be practiced in combination with dc/ac converters of any type. A fundamental circuit diagram explaining the broad principles of operation of the invention disclosed and claimed herein is shown in FIG. 6. Components which are identical or identical in operation to those described earlier are referenced with the same reference symbols as in the preceding figures. The dc/ac converter shown in FIG. 6 is referenced Wr and is not necessarily an externally-controlled dc/ac converter. The frequency of the output voltage of the converter Wr may, for example, be governed by an internal reference source S as shown in FIG. 6 and the voltage of the reference source S may be tapped by a transformer U and rectified in a full-wave rectifier G. The rectified sinusoidal voltage which thus occurs at the output of the rectifier G again serves as the theoretical voltage and is connected to the corresponding input of the comparator RK. The operation of the circuit shown in FIG. 6 is otherwise identical to that shown in FIG. 1. The auxiliary load circuit consisting of the collector-emitter path in FIG. 6 can also be modified in the same manner as is shown in FIGS. 3 and 5.

Although modifications and changes may be suggested by those skilled in the art it is the intention of the inventor to embody within the patent warranted hereon all changes and modifications as reasonably and properly come within the scope of his contribution to the art.

I claim as my invention:

1. A circuit for supplying a complex load ac consumer with an alternating voltage from a dc voltage source comprising:

a dc/ac converter;

a plurality of current direction-dependent switching elements connected to said load for preventing magnetic and electrical energy stored in capacitive or inductive components of the ac consumer being returned to said dc/ac converter;

an auxiliary load circuit connected in parallel with said ac consumer;

a controlled switching element for switching said auxiliary load circuit into and out of connection with said ac consumer;

a means for deriving a theoretical voltage signal;

a voltage comparator having an output connected to a control electrode of said controlled switching element and having inputs respectively supplied with an actual voltage signal derived from the voltage used by said ac consumer and said theoretical signal, said comparator comparing the voltages supplied to said inputs and supplying a signal to said control electrode to bring said controlled switching element to a conductive state when the voltage used by said ac consumer exceeds an instantaneous value of said theoretical signal as a result of the release of electrical or magnetic energy stored in said capacitive or inductive components of said ac consumer.

2. The circuit of claim 1 wherein said dc/ac converter is controlled by an external reference oscillator and wherein said means for deriving said theoretical signal derives said theoretical signal from said reference oscillator.

3. A circuit for supplying a complex load ac consumer with an alternating voltage from a dc voltage source comprising:
- a dc/ac converter;
- a plurality of current direction-dependent switching elements connected to said load for preventing magnetic and electrical energy stored in capacitive or inductive components of the ac consumer being returned to said dc/ac converter;
- an auxiliary load circuit connected in parallel with said ac consumer;
- a controlled switching element for switching said auxiliary load circuit into and out of connection with said ac consumer;
- a voltage comparator having an output connected to a control electrode of said controlled switching element and having inputs respectively supplied with an actual voltage signal derived from the voltage used by said ac consumer and a theoretical signal derived from said dc/ac converter,
- said comparator comparing the voltages supplied to said inputs and supplying a signal to said control electrode to bring said controlled switching element to a conductive state when the voltage used by said ac consumer exceeds an instantaneous value of said theoretical signal as a result of the release of electrical or magnetic energy stored in said capacitive or inductive components of said ac consumer.

4. The circuit of claim 3 wherein said theoretical signal is derived from the output voltage of said dc/ac converter.

* * * * *